United States Patent [19]

Loch

[11] 4,115,021

[45] Sep. 19, 1978

[54] IMPLEMENT ATTACHMENT TO SHANK

[76] Inventor: George N. Loch, Box 14, Glendon, Canada, TOA 1PO

[21] Appl. No.: 788,734

[22] Filed: Apr. 19, 1977

[30] Foreign Application Priority Data

Apr. 26, 1976 [CA] Canada ................................. 251283

[51] Int. Cl.$^2$ ............................................... B25G 3/00
[52] U.S. Cl. ..................................... 403/353; 403/362
[58] Field of Search ............... 403/353, 388, 390, 362, 403/380; 172/762, 751

[56] References Cited

U.S. PATENT DOCUMENTS

| | | | |
|---|---|---|---|
| 308,745 | 12/1884 | Brown | 403/380 |
| 2,878,080 | 3/1959 | Brutosky | 403/388 X |
| 2,908,340 | 10/1959 | Love et al. | 172/762 |
| 3,117,825 | 1/1964 | Loch | 403/353 X |
| 3,125,170 | 3/1964 | Rosenvold | 403/388 X |

*Primary Examiner*—Wayne L. Shedd
*Attorney, Agent, or Firm*—Stanley G. Ade

[57] ABSTRACT

Detachable cultivator teeth shovels and the like are usually bolted to the implement shank and these bolts corrode or rust, or get clogged with dirt or become burred over thus making detachment extremely difficult. The present device includes a quickly attachable and detachable implement to a shank which includes pins extending through the shank and the implement and being engaged by keyhole wedge slots of a locking plate which pulls the implement tightly to engagement with the shank by slight downward movement of the plate, the keyhole slots of which engage over cut away portions near one end of the pins. A set screw screw threadably engages the plate and is then tightened so that the inner ends bears against the shank and holds the assembly firmly in position yet enables the implement to be detached readily and easily when desired.

12 Claims, 5 Drawing Figures

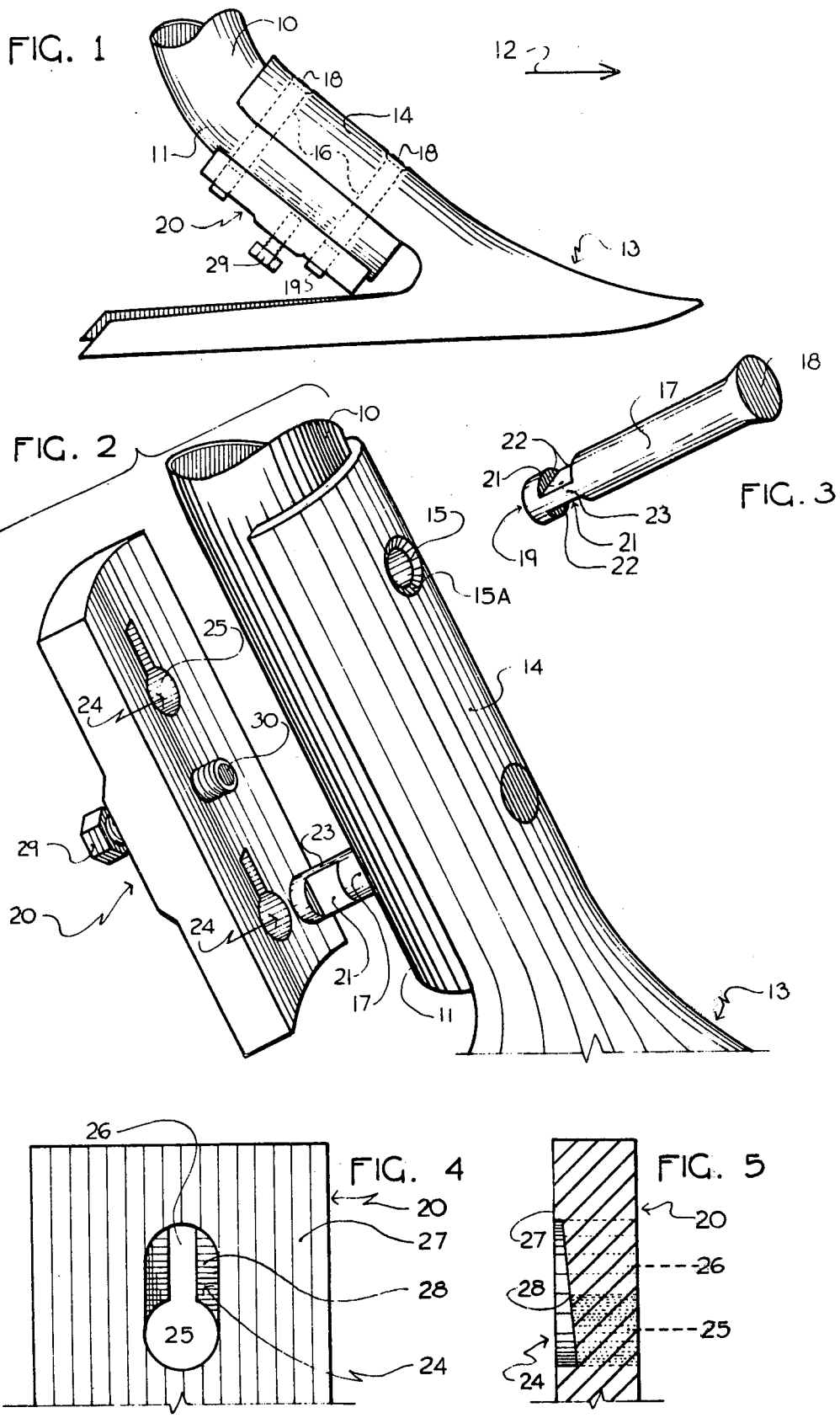

IMPLEMENT ATTACHMENT TO SHANK

BACKGROUND OF THE INVENTION

This invention relates to new and useful improvements in the attachment of a cultivating implement to a shank and may include cultivator teeth, cultivator shovels, seeding devices or the like.

Conventionally such implements are bolted to the lower end portion of a shank and not only due these bolts corrode or get burred thus making replacement difficult, but also constitute a time consuming chore when it is necessary or desirable to replace the implements. This is because an agricultural implement such as a cultivator or a seeding device normally includes a great many shanks and implements each conventionally held by at least two nut and bolt assemblies so that it will be appreciated that replacement is extremely time consuming.

SUMMARY OF THE INVENTION

The present invention overcomes these disadvantages by providing a quickly detachable implement to an implement shank which consists of engaging headed pins through aligned apertures in the shank and implement and then slipping a locking plate over the other ends of the pins, said locking plate having keyhole shaped slots which engage means on the other ends of the bolts thus snugging the immplement against the shank. A set screw is then tightened through the locking plate and bears against the shank thus clamping the implement and the locking plate firmly in position yet enabling same to be disassembled readily and easily when desired.

The principle object and essence of the invention is therefore to provide a quickly detachable means for securing an implement to a shank.

Another object of the invention is to provide means whereby an initial wedging action snugs the implement against the shank in an offset relationship and then a set screw is utilized to firmly clamp the implement in position.

Still another object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

FIG. 1 is a side elevation of the lower end of a shank showing a cultivator or seeder shovel secured thereto by the present invention.

FIG. 2 is an exploded isometric view of FIG. 1.

FIG. 3 is an isometric view of one of the bolts per se.

FIG. 4 is an elevation of a part of the locking plate showing one of the keyhole slots.

FIG. 5 is a cross sectional view of FIG. 4 taken through the keyhole slot.

In the drawings like characters of reference indicate corresponding parts in the different figures.

DETAILED DESCRIPTION

Proceeding therefore to describe the invention in detail, reference character 10 illustrates an implement shank, it being understood that this shank normally extends upwardly and is secured to an implement frame (not illustrated).

In this particular embodiment, the lower end portion 11 of the shank inclines downwardly and forwardly in the direction of travel which is indicated by arrow 12.

An implement collectively designated 13 is detachably secured to the lower end portion 11 of the shank and in this particular embodiment, the implement takes the form of a cultivator or furrow opening shovel. However it will be appreciated that cultivator teeth can be secured to a shank in the same way.

In this particular embodiment, the shank is cylindrical and the shank engaging portion 14 of the implement 13 is curved so that it will nest against the front of the shank when in the offset position illustrated.

At least two apertures 15 are formed through the shank engaging portion 14 of the implement and similar apertures indicated by the dotted lines 16, are formed through the lower end portion 11 of the shank so that the sets of apertures are in axial alignment when the shank engaging portion 14 is engaged with the shank in the attaching position illustrated in FIGS. 1 and 2.

Bolts 17 are provided to assist in detachably securing the implement to the shank and in this embodiment, flared heads 18 are provided on one end of the bolts which engage within the counter sunk portion 15A of the apertures 15 so that when in position, the headed ends of the bolts 17 are substantially flush with the outer surface of the shank engaging portion 14 of the implement.

Means are provided adjacent the other ends 19 of the bolts, for engagement by a locking plate collectively designated 20, said means taking the form of a pair of opposed grooves 21 extending laterally of the length of the bolt and just inboard of the end 19 and these grooves are defined by the radially extending faces 22 of the remainder of the bolt as clearly shown in FIG. 3 thus providing what is defined as a necked shank portion 23 of the bolts 17.

The aforementioned locking plate 20 is a substantially rectangular plate curved as illustrated in FIG. 2 to suit the curvature of the shank so that the locking plate will nest there against when in position.

A pair of keyhole slots collectively designated 24 are formed through the locking plate and details of these slots are shown in FIGS. 4 and 5.

The slots each include a substantially cylindrical bolt engaging portion 25 and what is defined as a necked shank portion engaging slot 26 extending from one side of the portion 25 as clearly illustrated in FIG. 4.

The outer face 27 of the locking plate is recessed in the area of the keyhole slots and the face 28 of the recess inclines upwardly and outwardly on each side of the slot 26. This means that the locking plate may be engaged over the ends 19 of the bolts 17 through the portions 25 and positioned so that the necked shank 23 of the bolts engages the slots 26. With the locking plate being moved downwardly at this time, a wedging action is initiated between the portions 22 of the bolt and the wedging faces 28 of the slots 26 thus snugging the shank engaging portion 14 against the shank and snugging the locking plate also against the shank.

A set screw or bolt 29 is screw threadably engageable through the locking plate, between the keyhole slots 24 and this is then tightened so that the inner end 30 of the bolt engages the surface of the lower end portion 11 of the shank and tightening of the set screw clamps the assembly firmly in position against relative movement with the shank.

Disengagement is relatively easy inasmuch as set screw 29 is unscrewed and the locking plate given a blow on the lower end thereof driving it upwardly and out of engagement with the necked portion 23 of the bolts so that the locking plate can readily be removed. The implement 13 is then easily removed from the shank and a new one installed without any difficulty.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. Means for detachably securing an implement such as a cultivator tooth, shovel or the like, to the lower end of a cultivator shank in which said implement is supported against the lower end portion of the shank in offset relationship, said implement and said shank being apertured, the apertures being in axial alignment when said implement is supported against said shank as aforesaid; said means comprising in combination at least two connecting bolts one each engaging through sets of aligned apertures in the associated implement and shank, head means on one end of each of said bolts, limiting the endwise movement of said bolts through said apertures, a locking plate having keyhole shaped slots formed therein and engageable over the other ends of said bolts, means adjacent said other ends of said bolts engaging through said keyhole slots in sliding locking relationship therewith, and a set screw screw threadably engaging through said locking plate and bearing against said shank to clamp said implement and said locking plate to said shank when said set screw is tightened.

2. The invention according to claim 1 in which said means adjacent the said other end of said bolt comprises a pair of opposed grooves formed in said bolt and extending laterally of the length of said bolt and defining a necked shank portion of said bolt, said keyhole slot including a substantially cylindrical bolt engaging portion and a necked shank portion engaging slot extending from one side of said bolt engaging portion.

3. The invention according to claim 2 in which the outer face of the portion of said locking plate defining said slot is recessed and inclines outwardly from the junction of said slot with said bolt engaging portion, the end of said bolt beyond said grooves engaging said outer face with a wedging action.

4. The invention according to claim 1 in which the heads of said bolts are substantially flush with the outer surface of said implement when in position.

5. The invention according to claim 2 in which the heads of said bolts are substantially flush with the outer surface of said implement when in position.

6. The invention according to claim 3 in which the heads of said bolts are substantially flush with the outer surface of said implement when in position.

7. In a cultivating implement which includes a tool shank, an implement detachably secured thereto in offset relationship, means to detachably secure said implement to said shank, said shank being cylindrical, said implement including a shank engaging portion, said shank engaging portion being curved to nest against said shank, said shank and said shank engaging portion being apertured, said apertures being in axial alignment when said shank engaging portion is supported against said shank, at least two connecting bolts one each engaging through sets of aligned apertures in said shank engaging portion and said shank, head means on one end of each of said bolts, limiting the endwise movement of said bolts through said apertures, a curved locking plate having keyhole shaped slots formed therein, said locking plate nesting against said shank when said locking plate is in position, said locking plate engaging over the other ends of said bolts by said keyhole shaped slots, means adjacent said other ends of said bolts engaging through said keyhole slots in siding locking relationship therewith and a set screw screw threadably engaging through said locking plate and bearing against said shank to clamp said implement and said locking plate to said shank when said set screw is tightened.

8. The invention according to claim 7 in which said means adjacent the said other end of said bolt comprises a pair of opposed grooves formed in said bolt and extending laterally of the length of said bolt and defining a necked shank portion of said bolt, said keyhole slots including a substantially cylindrical bolt engaging portion and a necked shank portion engaging slot extending from one side of said bolt engaging portion.

9. The invention according to claim 8 in which the outer face of the portion of said locking plate defining said slot is recessed and inclines outwardly from the junction of said slot with said bolt engaging portion, the end of said bolt beyond said grooves engaging said outer face with a wedging action.

10. The invention according to claim 7 in which the heads of said bolts are substantially flush with the outer surface of said implement when in position.

11. The invention according to claim 8 in which the heads of said bolts are substantially flush with the outer surface of said implement when in position.

12. The invention according to claim 9 in which the heads of said bolts are substantially flush with the outer surface of said implement when in position.

* * * * *